April 6, 1948. F. B. YINGLING 2,439,233
SPOT WELDING APPARATUS
Filed April 14, 1944 3 Sheets-Sheet 2
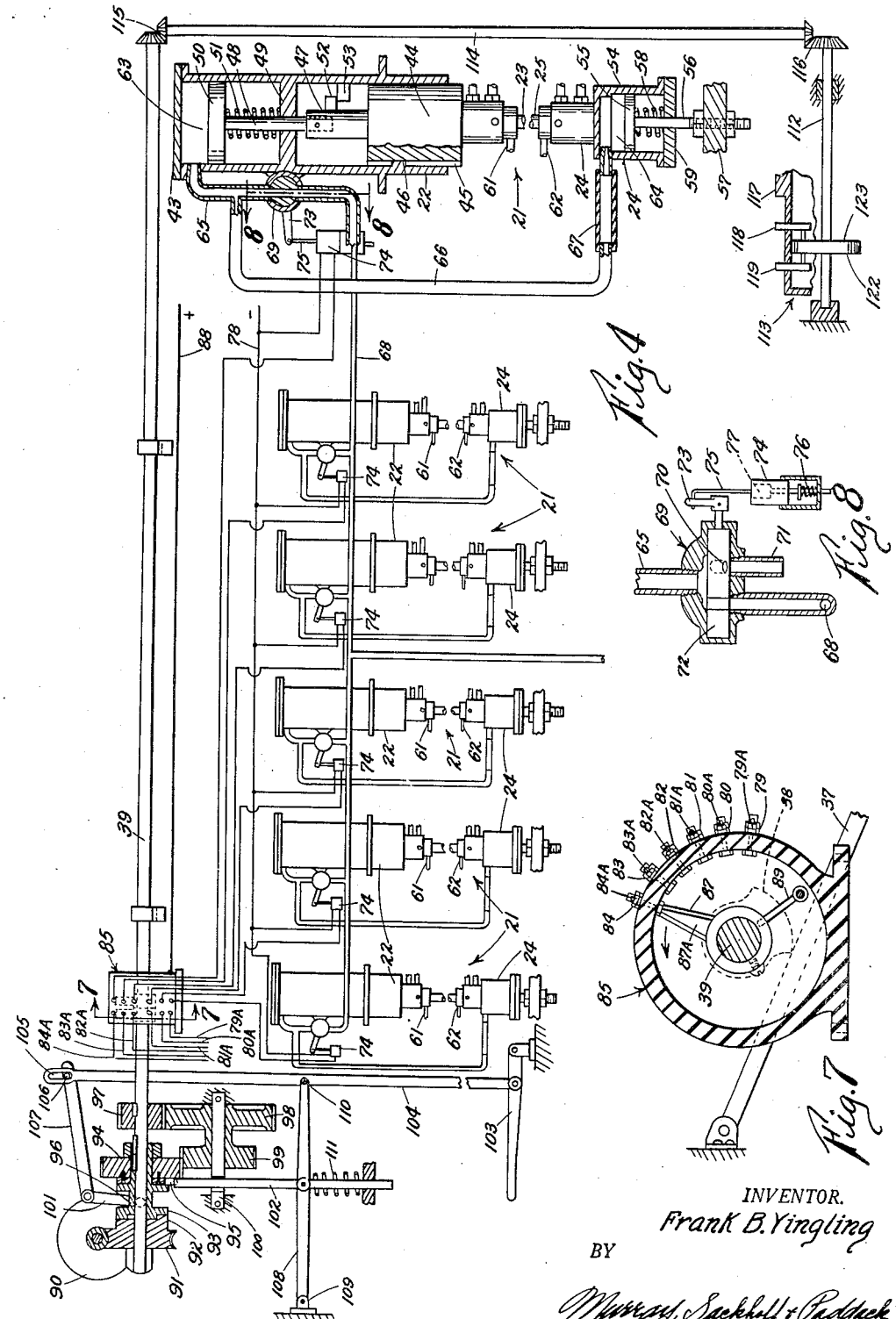
INVENTOR.
Frank B. Yingling
BY
Murray, Sackhoff & Paddock
ATT'YS April 6, 1948.   F. B. YINGLING   2,439,233
SPOT WELDING APPARATUS
Filed April 14, 1944   3 Sheets-Sheet 3

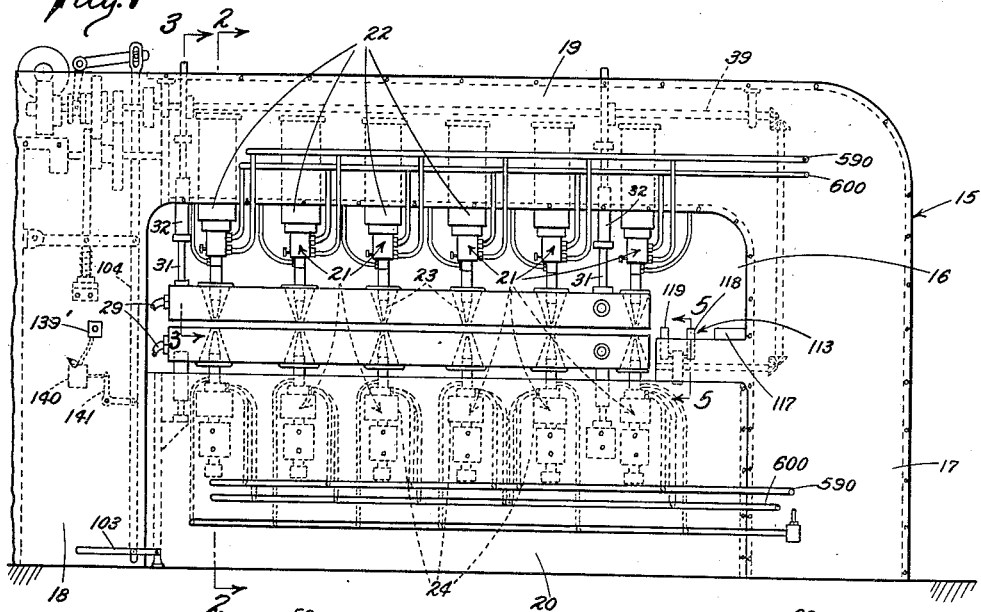

INVENTOR.
Frank B. Yingling
BY
Murray, Sackhoff & Paddack
ATT'YS

Patented Apr. 6, 1948

2,439,233

UNITED STATES PATENT OFFICE 2,439,233

SPOT WELDING APPARATUS

Frank B. Yingling, Hamilton, Ohio

Application April 14, 1944, Serial No. 530,991

13 Claims. (Cl. 219—4)

The present invention relates to spot welding apparatus and has for an object the provision of a machine for quickly producing a row of aligned or staggered spot welds in closely spaced relation without impairing any existing heat-sensitive properties of the metal operated upon.

A further object of the invention is to provide a machine embodying a plurality of spaced electrodes arranged for successive operation upon the work in combination with a work shifting sheet holder to enable very close spacing of the spot welds with the use of conveniently spaced pairs of large and sturdy electrodes.

A still further object of the invention is to provide a work holder which is arranged to absorb and dissipate the heat of the spot welding operation and to effectively prevent the accumulation of a detrimental amount of heat in the metal.

Another object of the invention is to provide a machine for speed production of spot weld seams on metal or alloy sheets which have heretofore presented difficulties due to the light gauge or the heat destructible properties of the metal.

These and other objects are attained by the means and method described herein and exemplified in the accompanying drawings, in which:

Fig. 1 is a front elevational view of an automatic spot welding machine embodying the features of the invention, parts being shown in dotted lines.

Fig. 2 is a cross-sectional view taken on line 2—2 of Fig. 1.

Fig. 3 is a cross-sectional view taken on line 3—3 of Fig. 1.

Fig. 4 is an enlarged view, partly in section, and in part diagrammatically showing the automatic electrically controlled pneumatically operated electrodes and the synchronized spacing means.

Fig. 5 is a cross-sectional view taken on line 5—5 of Fig. 1.

Fig. 6 is a fragmental plan view showing the spot welding of a seam according to the method and means of the invention in line welding.

Fig. 7 is a cross-sectional view of a timing mechanism which is shown diagrammatically at line 7—7 of Fig. 4.

Fig. 8 is a cross-sectional view of an electromagnetically actuated air valve for controlling the contacting electrodes of the machine of the invention taken on line 8—8 of Fig. 4.

Figure 9:
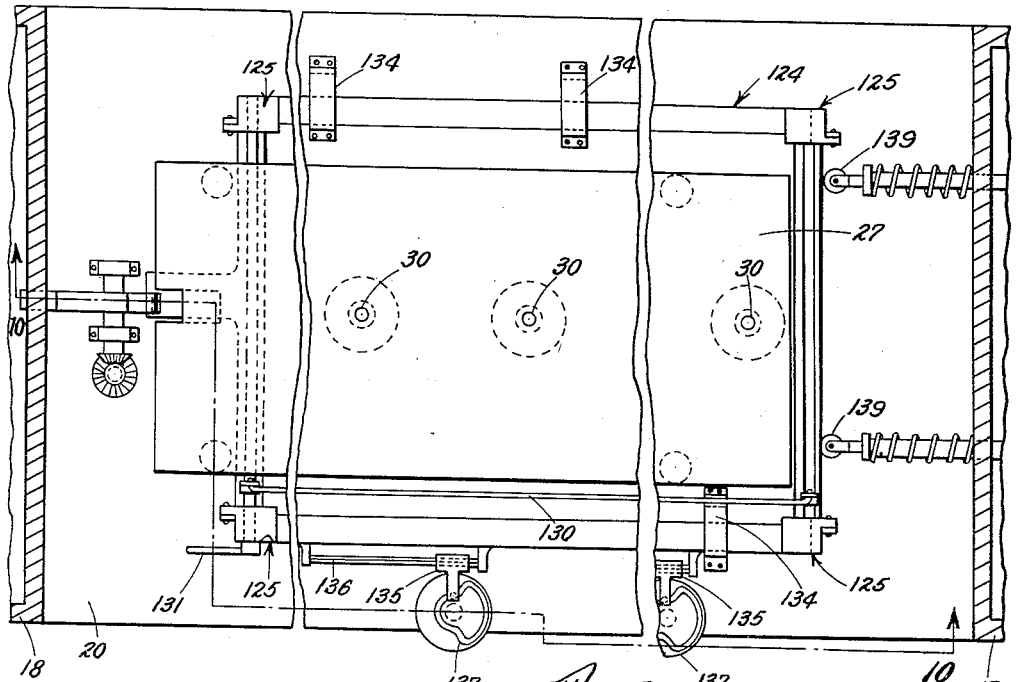
Fig. 9 is a fragmental plan view of an alternative form of sheet holder for producing a double row of staggered spot welds.

Heretofore the joining of sheet metal and alloy sheets has presented problems which were not satisfactorily handled by spot welding due to the characteristics of certain metals and alloys, particularly in lighter gauges thereof. Light gauges of certain hardened aluminum alloys, for example, lost the desired special properties in the spot welding thereof, and the strength and rigidity of the sheets was impaired in the vicinity of the seam. Those metals which are of high thermal conductivity are incapable of receiving a multiplicity of closely spaced spot welds in rapid succession by previously known methods and means without excessive accumulation of heat.

It is the object of the present invention to overcome all of these difficulties and to generally speed up the spot weld seaming of sheet metals as well.

The invention comprises generally a plurality of pairs of electrodes at regularly spaced intervals and arranged to be successively actuated in rapid sequence together with a work cooling holder and a spacing mechanism whereby the work may be shifted to attain a desired number of spot welds in a space equal to the distance between two adjacent pairs of electrodes. The method of forming a spot welded seam according to the present invention provides for a minimum of shifting of the work and a relatively low power consumption, and comprises the rapid and successive production of regularly spaced spot welds distributed over the length of the seam to be formed, and the step-wise shifting of the work for distances which are a fraction of the space between the adjacent initial series of spot welds. The sum of these stepwise shifting movements is thus less than the spacing between the welds of the initial series so that little time is consumed in these short movements of the work. At the same time no two spot welds in the finished seam are made at such close time intervals as to permit the accumulation of a detrimentally high temperature in the metal. Furthermore, the method consists in holding the work in chilled or heat-dissipating holders which preclude the flow of heat by conduction to any remote part of the sheet.

In the illustrated embodiment of the invention, (see Fig. 1), there is provided a suitable hollow frame 15 having an opening or tunnel 16 therethrough. Tunnel 16 is bounded on the sides by hollow columns 17 and 18, on the top by a hollow cross beam 19 extending between said columns, and on the bottom by a hollow base 20 which also extends between the columns.

As can be readily seen in Figs. 1, 2, and 3, a plurality of spot welding units 21 are disposed in aligned relation within tunnel 16, the support structures 22 of the upper electrodes 23 being mounted in depending relation at least partially within the hollow cross beam 19, while the support structures 24 of the lower electrodes 25 are arranged in opposed relation partly within the hollow base 20.

Supported within the tunnel 16 are two opposed work clamps 26 and 27, each of which has openings 28 through which the several electrodes may pass in order to effect the spot welding operations. The complementary work clamps 26 and 27 are of high heat conducting metal and are arranged to contact the top and bottom of both pieces of the work to be joined by a spot welded seam with the exception of small circular areas wherein the electrodes contact the work.

In the present embodiment clamps 26 and 27 are hollow bodies arranged to receive a circulating body of coolant liquid which may be tap water or a circulating refrigerated brine solution, the coolant being supplied from a suitable source (not shown) and connected with the clamps by flexible tubes 29 (see Fig. 1). The openings 28 in the chilled work clamp members 26 and 27 are bounded by frusto-conical walls which are externally clad or lined with any suitable material or materials to provide insulators 30 which are desirably insulators of both heat and electricity. From the foregoing it will be noted that in forming a spot welded seam on a pair of overlapped metal sheets each spot weld site is closely surrounded on both faces of the work by a relatively large expanse of chilled contacting work clamp which positively precludes any appreciable flow of heat from the spot to a remote portion of the work.

Clamps 26 and 27 are mounted for limited yielding pressure engagement on the work by any suitable means. The upper chilled clamp plate 26 is suspended from points near the four corners thereof by rods 31 telescopically mounted in cylinders 32 with springs 33 yieldably urging said rods downwardly. Cylinders 32 are fixed to the lower ends of vertically reciprocable rods 34 which are guided in suitable bearings in the hollow beam 19, and which rods are connected by transverse bars 35. Springs 36 serve to suspend the structure in a slightly elevated position wherein the upper plate 26 is lifted free of lower clamp plate 27, and the work sheets may be entered into, shifted, or withdrawn from, the space between the upper and lower clamp plates. Two or more pivoted levers 37, each operated by a cam 38 on a power driven shaft 39, serve to exert pressure on cross bar or cross bars 35 and thus urge upper clamp plate 26 upon the inserted work sheets to hold the latter during a predetermined interval (see Fig. 3).

The lower clamp plate 27 is yieldably supported upon tubular members 40 each containing a coiled spring 41 which abuts the member 40 at one end and the end of a fixed rod 42 at the other end. By this arrangement the work receiving face of plate 27 will hold the inserted work out of contact with the lower electrodes 25 until the upper clamp plate 26 is forced down by the hereinbefore described means. The result of the joint action of the upper and lower clamp plates is to firmly clamp the work and floatingly support it in position for engagement of the electrodes and thus permit the application of the welding pressures of the latter to the work without danger of local distortion of the sheets. The effect of the cooling work clamps, as herein provided, is to eliminate to a large degree the buckling of the sheets in advance of the application of pressure by the electrodes, and it also serves to avoid distortion of the sheets by the electrodes, in addition to the control of detrimental temperatures in the sheets worked upon.

It will be understood that a machine of the invention may be designed to include a desired number of spot weld units to accommodate a given width of work sheet and that an automatic spacing mechanism may be utilized for attaining any desired number of spot welds in multiples of the number of spot weld units. For the purpose of exemplification the present device is illustrated to represent, say six spot weld units 21, spaced six inches apart and the spacing mechanism is shown adapted for effecting two-inch spacing of the welds. It will be understood that modified spacing mechanism may be utilized for attaining a greater or lesser spacing with the same number or multiples of spot weld units in the machine.

The units 21 are arranged to be actuated in rapid succession and thus provide for no greater instantaneous welding current demand than previously known spot welding machines embodying a single spot weld unit. The hereinafter described means are provided whereby the six spot weld units 21 are automatically actuated in rapid succession by manual, electrical or pedal operated means. Reference is made to Figs. 1 to 4 which show the various details of arrangement, structure, and control of the units 21 in sequence. The machine continues automatically, after producing one series of six spot welds, all of which is repeated at each turn or one revolution of shaft 39 until the series of welds are completed, then stops automatically to permit withdrawing of the welded sheets and the placing of succeeding new sheets to be welded. The arrangement is best understood in connection with Fig. 4 which omits the showing of the work cooling clamps. The upper support structure 22 of each spot welding unit 21 forms a cylinder having a closed top 43. Within the open bottom of support member or cylinder is a reciprocably mounted holder 44 which receives the upper electrode 23 of the unit. Holder 44 has a longitudinal groove 45 whereby the holder is guided on a fixed key 46 on the inside wall of the cylinder. A stem 47 on the top of holder 44 has a piston rod 48 of reduced diameter which passes through an opening in a cross-head piece 49 in cylinder 22. Rod 48 has a suitable air piston 50 at the top end, and a spring 51, surrounding said rod, abuts the piston 50 and cross piece 49 respectively at its opposite ends to yieldingly urge the piston and the associated holder 44 to a raised position. A pair of cooperating stop lugs 52 and 53 on the stem and cylinder respectively serve to positively limit downward movement of the holder.

The holder 24 for the lower electrode 25 has a depending inverted cylinder 54 which is reciprocably mounted on a fixed piston 55 carried by a rod 56 that is mounted for limited vertical adjustment on a cross arm 57. A coil spring 58 abuts the bottom of piston 55 and the top of a member 59 on cylinder 54 and thus yieldingly holds the electrode holder 24 in a lowered position.

The upper and lower holders 44 and 24 together with the electrodes 23 and 25 are liquid cooled in known manner by way of supply tubes 59 and return tubes 60. Said tubes are connected with common supply and return lines 590 and 600 which serve all of the units 21 of the machine.

Welding potential is applied to electrodes 23 and 25 of each unit 21 by flexible conductors 61 and 62 which are suitably connected with transformer apparatus (not shown) which may be housed within the hollow frame structure 15. This will be well-known equipment utilizing electronic timers which are now in successful use and available on the market.

Electrodes 23 and 25 are actuated by air pressure delivered into pressure chambers 63 and 64 respectively from opposite ends of a communicating air line comprising part of a feed pipe 65, and a branch pipe 66 which is connected by means of a flexible tube 67 to the reciprocating cylinder 54. Thus in each unit 21 the upper and lower electrodes are brought together by uniform air pressure in their respective pressure chambers operating against the yielding pressure of the springs 51 and 58. The resultant of the forces thus causes the electrodes to find an initial uniform engagement with opposite sides of the work, produced and followed by uniform pressures. It will be remembered that the work cooling clamp plates, due to their particular mounting, serve to facilitate centering of the interposed sheets.

Each of the pressure air feed pipes 65 is connected to a constant pressure air supply line 68 and has a double valve 69 (see also Fig. 8) disposed therein intermediate line 68 and the junction of branch pipe 66 and its connected pressure chambers 63 and 64 are vented to the atmosphere through passage 70 and vent 71. Valve member 72 is mounted for limited rotational movement in its casing and has an external crank arm 73. A solenoid 74 has a stem or rod 75 connected to crank arm 73. The spring 76 urges arm 73 upward to the venting position and said arm is lowered by the action of armature 77 on the rod which overcomes spring 76 and moves valve member 72 to a position (as shown in cross-section in Fig. 4) wherein the branch pipe is cut off from the vent tube and is connected with pipe 68.

The solenoids 74 of the several spot weld units 21 are all connected at one end with a common return wire 78 of a control circuit for effecting a synchronized and successive operation of the several units 21. The remaining ends of the several solenoids are connected respectively to the terminals of contact members 79, 80, 81, 82, 83, and 84, of a timer 85. A power driven shaft 39 extends through the timer 85 and carries a rotary contact armature 87 to which the conductor 88 of the solenoid control circuit is connected by the contact armature 89. This mechanism and the electric circuits serve to actuate, lower and raise the electrodes in sequence to and from the work to be welded.

A second series of electrical contactors 79A, 80A, 81A, 82A, 83A, and 84A are mounted on timer housing 85, which by means of a cooperating armature 87A momentarily actuates the starting of the welding current contactors, so that the welding current is applied for each welding head in sequence, after the electrodes are firmly applied to the work, and also the welding current is automatically cut off before the electrodes are released from the work. The widths of contact surfaces 79—80—81—82—83—84 are sufficient to cause the electrodes to hold in firm contact position, during the time of the welding and while the welding current flows from one electrode to the other.

The automatic control and power drive mechanism of the apparatus comprises an electric motor 90 with adjustable or variable speeds which drives a worm gear 91 which turns freely on shaft 39. Integral with or fixed on gear 91 is a toothed clutch element 92. A complementary clutch element 93 on spool 96 is slidably keyed to shaft 39 and a relatively wide pinion 94 is located on sleeve or spool 96 as an operating unit but is free to turn on spool 96, being independently driven at a lower speed by gears 97, 98, and 99 for the purpose of timing the number of revolutions of shaft 39 for a particular cycle of spot welds, as required, before completion of the seam or series joining of the sheets worked upon. Pinion 94 has a hold-out cam 95 fixed solidly on one face thereof and mounted on clutch spool 96 serves to actuate longitudinally the elements 93 and pinion 94 with unitary sliding movement on shaft 39. Pinion 97 is keyed to shaft 39 which is in constant mesh with gear wheel 98 which turns with pinion 99 on back shaft 100. Pinion 99 is in constant engagement with pinion 94 which is free to rotate on the sliding clutch element 93—96. When clutch 92—93 is engaged by movement of clutch yoke 101 the shaft 39 is turned through the aforementioned clutch spool 96 at low speed, as desired, e. g. say 5 to 15 R. P. M. or faster. A hold-out and throw-out plunger 102 is spring urged toward hold-out cam 95 and it is arranged to be momentarily withdrawn during movement of yoke 101 in engaging clutch elements 92—93. Plunger 102 rides on the edge of cam 95 for nearly one revolution of gear 94 and clutches 92—93 are then ready to be disengaged by the cam 95 whereupon the plunger 102 moving in serves to disengage the clutch elements 92—93. Any other known mechanism may be employed for stopping the shaft 39 at the end of the predetermined number of full revolutions, in this case three to a complete cycle. By changing the gear ratio of gears 97 and 98, the number of turns of shaft 39 is changed, to decrease or increase the revolutions, before the cam 95 on gear 94 throws clutches 92 and 93 out of engagement.

A pedal operated device for initiating the power drive of shaft 39 comprises a pivoted lever 103 operating a connecting rod 104, which has a lost motion slot 105 that receives pin 106 in bell crank arm 107 of the clutch shifting lever or yoke 101. The hold out plunger 102 is pivoted intermediate the ends of a lever 108. Lever 108 has a stationary pivotal mounting at one end 109, while the other end 110 is pivoted to connecting rod 104. Spring 111 urges both the plunger 102 and connecting rod 104 in an upward direction and provides the movement and resultant cam force which enables the plunger 102 to disengage the clutches 92—93 as the plunger is moved in front of cam 95.

Shaft 39 which extends through hollow cross beam 19, serves to drive shaft 112 of an automatic spacing stop device 113, through the agency of an intermediate vertical shaft 114 and bevel gearing at 115 and 116, the latter having a reduction factor which is determined by the total number of spacing stops in the device 113 permitted between cycles from the beginning to the conclusion of all the spot welds of a series. For the purposes of a simplified disclosure, and not as a limitation on the final number of spot welds in a seam, it is assumed that the welds shall be two inches apart and hence three spacing stops are employed for a series of welds and the speed ratio of shaft 112 to shaft 39 is one to three (1–3). The spacing stops comprise a fixed or final stop 117, an intermediate retractable stop 118 and an initial retractable stop 119. As can be best seen in Fig. 5 each of the spacing stops (e. g. stops 118 and 119) is moved up by a spring 120, in a slot in the work support so as to position the work relative to the series of electrodes on spot weld units 21. A double faced cam wheel 122—123 on shaft 112 serves to allow stop 119 to remain in elevated position during the first one-third revolution of said shaft during which the welding units 21 operate in rapid succession to form six spot welds a in a line across the overlapped work sheets W (see Fig. 6). The machine is not automatically stopped by the clutch throw-out plunger 102 until a complete welding cycle takes place and after face cam 122 on shaft 112 has pulled stop 119 below the surface of the top face of device 113 and cam 38 (Fig. 7) has released its pressure on pivoted lever 37. The work sheets are now repositioned, reclamped, and the second series of welds follows automatically. The spacing stop 118 is lowered, the work sheets are released, and repositioned against work stop 117, and are then reclamped. The third series of welds follows automatically. The work sheets are then released, and are now ready for removal, whereupon the machine stops motion automatically. New work sheets can now be placed in the machine for repetition welding.

The work sheets W are successively placed in the welding machine after the same is automatically stopped by cam 95 after a series of spot welds have been made completely finishing the cycle. Operations of the machine are started manually by lever 103 or push button 139' later described. After the work sheets W, being welded are moved into the machine against spacing stop 119 the machine is started on its cycle, the sheets are clamped, and the electrodes are moved into position. At this instant the sheets W are joined by six spot welds a spaced at six-inch intervals and the sheets are now released and free to be shifted in the line of said second row of spot welds, for a distance of two inches, into abutment with intermediate retractable stop 118. A second cycle of machine operation begins automatically on the second revolution of shaft 39. Lever 37 is depressed automatically to engage the work cooling clamps, then the units 21 are successively engaged on the sheets W to produce welds b, after which face cam 123 retracts spacing stop 118 and work clamps 26 and 27 are released and the machine continues in operation while the work is then shifted to the permanent or the last spacing stop 117 ready for the next and final series of spot welds c. After this the operation of the machine stops automatically.

It will be noted that stop 119 was retracted and remained so during the second and third cycles of machine operation while stop 118 was also retracted during the third cycle of machine operation.

If a closer spacing of spot welds in a seam be required a spacing stop device embodying a greater number of retractable spacing stops would be employed and the gear ratio at the clutches 92—93 and at 116 would be changed to correspond therewith, in a manner that will be readily understood by those versed in the art after a persual of the foregoing example.

The intermittent feed of the work against the stops may be manual as shown in Fig. 1, but an automatic spacing feed is preferred.

Figure 10:
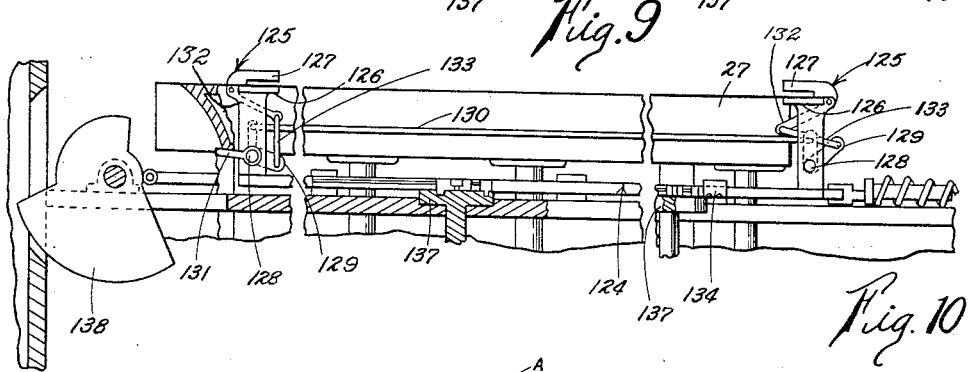
Fig. 10 is a view taken on line 10—10 of Fig. 9.
Figure 11:
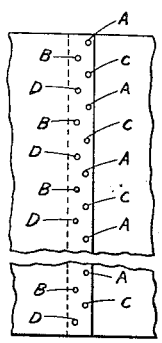
Fig. 11 shows staggered welding rows.

In Figs. 9 and 10 there is shown an automatic work shifting mechanism which may be embodied in the device of Fig. 1. A work shifter frame 124 carries two pairs of jaws 125 which are simultaneously openable to receive and closable to grip the opposed longitudinal edges of overlapped sheets to be joined. The lower element 126 of each jaw is fixed at approximately the level of the top face of the lower cooling plate 27 while the upper element 127 is hinged for relative movement. Transverse shafts or rods 128 are mounted for oscillation beneath each group of jaws 125 and each rod carries a rigidly attached bell crank 129 at one end. A link 130 connects the bell cranks for unitary movement, and a lever 131 provides for manual actuation of the bell cranks 129. The pivoted upper element 127 of each jaw has an integral lever member 132 with a pivoted link connection 133 between it and the free arm of bell crank lever 129.

Frame 124 is laterally and longitudinally shiftable in fixed guides 134. A pair of slides 135 on a rod 136 is adapted to be actuated by a pair of synchronously driven cams 137 for shifting frame 124 alternately to within the lateral limits of guides 134 and to at the same time permit an end cam 138 to effect step by step longitudinal movement of the frame in said guides against the resistance of a pair of yielding abutments such as pneumatic cylinders or spring urged rollers 139. Power cams 137 and 138 are synchronized to move the work sheets for effecting a double and staggered row of spot welds in the seam joint of the work. If the staggered weld is not desired, the cams 137 may be locked against movement and disconnected from their power drive by sliding clutches, so that all of the operations of the electrodes will be in alignment as shown in Fig. 6.

In operation for production jobs a plurality of stock sizes of sheets may be joined in end to end relation by positioning one edge of a newly inserted sheet over the trailing edge of a previously joined sheet, and pulling the work progressively through tunnel 16 as each seam is completed. Metal aircraft work is greatly expedited due to the speed with which each cycle of spot weld operation is completed and to the relatively limited amount of movement of the work in order to attain the desired spacing of the spot welds.

In practice it is deemed desirable to provide a push button controlled electro-magnetic initiating device for starting each cycle of operations, this being effective on the pedal controlled link 104. Such a control is shown partly in dotted lines in Fig. 1. The push button 139' controls a solenoid 140 operating a pivoted bell crank lever 141 which depresses connecting rod 104 in the same manner as the pedal 103.

The invention will not be understood to be limited to the specific example disclosed herein since it may be modified in certain details without departing from the spirit of the invention or the scope of the appended claims.

In view of the foregoing the manner of operation of the machine will be readily understood. It may be noted, however, that a single cycle of operation of the machine, including a predetermined number of revolutions of shaft 39 produces the prearranged straight line spot weld seam or double or triple row staggered spot weld seam entirely across the sheet. And it will be further noted that the spot welds may be arranged for spacing at a predetermined distance less than the space between adjacent spot welding units. The total amount of shifting of the work during completion of a seam is very small and the time is likewise quite short. The spacing of the spot welding units is sufficiently great to admit of an easy mounting of and access to the spot weld units and the operation of the electrodes of the latter.

What is claimed is:

1. In a device of the class described the combination of a spot welding unit comprising opposed electrodes, work cooling clamp plates, means yieldingly mounting said plates for floatingly supporting sheets to be welded within the field of operation of the electrodes, said plates having coinciding apertures for the passage of said electrodes to the work, and means for actuating the electrodes.

2. In a device of the class described the combination of a pair of opposed cooperating spot welding electrodes, a pair of opposed work cooling clamp plates for clamping work on opposite faces and provided with apertures for the passage of said electrodes to and from the work, means to floatingly support said clamp plates, means yieldingly separating the clamp plates, and means positively moving one of the clamp plates to engagement with work supported on the other of said clamp plates against the resistance of said yielding separating means.

3. In a device of the class described the combination of a pair of opposed cooperating electrodes, work cooling clamp plates for clamping the work on opposite faces and provided with apertures for the passage of the electrodes to and from the work, means to floatingly support said clamp plates, means yieldingly separating said clamp plates, means including a constantly operating shaft and cams thereon for positively moving one of the clamp plates into engagement with work supported on the other of said clamp plates against the resistance of said yielding separating means, pneumatic means for actuating the electrodes, and synchronizing control means including the aforesaid cam shaft for said clamp plate engaging means and further comprising an electrical timer on said shaft and electrical actuators for said pneumatic electrode actuating means providing for engagement of the clamping means in advance of actuation of the electrodes.

4. In a device of the class described the combination of a plurality of aligned spot welding units, each comprising a pair of cooperating electrodes, work cooling clamp plates having apertures therein for the passage of said electrodes, means floatingly supporting said clamp plates, means for actuating the electrodes of said spot welding units, and power controlled synchronizing mechanism including an automatic throw-out clutch whereby the clamping plates are engaged and the spot welding units are successively actuated a predetermined number of times prior to operation of the automatic throw-out clutch.

5. In a device of the class described the combination of a plurality of aligned spot welding units, each comprising a pair of cooperating electrodes, work cooling clamp plates having apertures therein for the passage of said electrodes, means floatingly supporting said clamp plates with the apertures thereof constantly arranged for the passage of said electrodes therethrough, means yieldingly retaining said clamp plates in a relatively separated relation, means positively moving one of the clamp plates toward the other of said clamp plates against the resistance of said yielding separating means, means for actuating the electrodes of said spot welding units successively, means whereby the electrodes are energized successively, and power driven synchronized means including an automatic throw-out clutch whereby the clamp plate engaging means are operated for a predetermined interval, during which interval the several pairs of electrodes are actuated and energized severally and successively.

6. In a device of the class described the combination of a plurality of aligned spot welding units, each comprising a pair of cooperating electrodes in normally separated relation, a pair of work cooling clamp plates having apertures therein for the passage of said electrodes, means floatingly supporting said clamp plates, means yieldably separating said clamp plates, means for positively engaging one of the clamp plates upon work supported by the other of said clamp plates against the yieldable separating means, means for actuating the electrodes, means for energizing the electrodes, automatic work spacing means including retractable stops, automatic work shifting means for moving the work against said stops, and power drive control means including an automatic throw-out clutch whereby the clamp plates are engaged upon work interposed between them, the several electrodes are separately actuated and energized in succession and after which the clamp plates are momentarily released and a spacing stop is retracted as the work shifting means is operated whereupon the aforementioned sequence of operation is repeated automatically until the operation of the automatic throw-out clutch is effected.

7. Automatic spot welding apparatus comprising a plurality of aligned spot welding units each comprising a pair of pneumatically operated cooperating electrodes in normally separated relation, pneumatic means including a double valve for each of said units whereby said units are actuated, a solenoid controlling operation of each of said valves, a power source, a shaft, a drive connection and control means including an automatic throw-out clutch whereby the shaft is rotated by the power means for a predetermined number of revolutions and at a predetermined rate and is then automatically stopped, a stationary timer surrounding said shaft and having electrical connections with the respective solenoids, a second set of electrical connections on said timer for energizing the respective spot welding units, armatures on said shaft for cooperation with the electrical connections on said timer, and means for initiating the drive connection between said power source and said shaft.

8. An automatic multiple spot welding apparatus comprising a hollow frame having a tunnel opening therethrough, a plurality of spot welding units having the cooperating components thereof disposed in alignment and supported in the top and bottom of the tunnel respectively, pneumatic means for actuating said components toward each other, a valve controlling each spot welding unit, a solenoid for each valve to control actuation thereof, a power member carried by the frame, a shaft extending through the frame, a pair of work cooling clamp plates floatingly mounted within the tunnel and having apertures therethrough for the passage of the electrodes, a fixed timer member surrounding the shaft and having two series of electrical contacts thereon, a pair of contacting arms mounted on the shaft and cooperating with said series of contacts respectively, electrical connections between one series of contacts and the respective solenoids, the remaining series of contacts being adapted for establishing connection between a source of welding current and said electrodes respectively, cam means carried in part by said shaft and adapted to effect clamping engagement of said floatingly mounted clamping plates, a work shifting and positioning cam adapted to be driven at predetermined speed with relation to said shaft, a power drive and control means including an automatic throw-out clutch for effecting a predetermined number of revolutions of said shaft and means for initiating operation of the last mentioned means.

9. In a spot welding apparatus the combination with a pair of cooperating electrodes, of a pair of hollow work holding clamp plates having relatively restricted passages therethrough for movement of the electrodes, means floatingly supporting said hollow plates for limited adjustment in the direction of movement of the electrodes, said mounting means for said plates serving to retain the passages therein in axial alignment with the electrodes, means connected to each of said hollow plates for providing a circulating coolant medium in said plates and means for positively effecting clamping engagement of said plates upon interposed sheets to be welded.

10. In a spot welding apparatus the combination with cooperating electrodes, of a pair of work cooling clamp plates each comprising hollow heat conducting bodies having frustoconical openings therethrough for the passage of said electrodes, electrical insulating material lining the wall of each opening, and means communicating with the interior of said clamp plates and providing for the circulation of a coolant medium therethrough.

11. In an automatic spot welding apparatus, the combination of a row of spot welding units each comprising opposed electrodes, a pair of opposed clamp plates having restricted apertures for the passage of the respective electrodes, means floatingly supporting said plates, means yieldably retaining said plates in slightly spaced relation, and cyclically operating actuating mechanism arranged for initially clamping said plates on interposed metal sheets, then actuating the welding units in predetermined order and then releasing said plates to permit shifting of the interposed sheets.

12. In an automatic spot welding apparatus, the combination of a work cooling clamping means, means for engaging the clamping means on interposed work sheets, means for shifting such interposed sheets, a plurality of spot welding units, and cyclically operating power driven means for actuating the clamping means, for then actuating the spot welding units in predetermined succession, for then releasing the clamping means and actuating the shifting means.

13. In a multiple spot welding apparatus the combination of a plurality of spot welder units arranged in uniformly spaced relation in alignment, said units each comprising a pair of yieldably separated electrodes and a valve controlled pneumatic means operable simultaneously on said electrodes for moving them for welding pressure, means to successively actuate the valves for predetermined intervals of time, means to energize the electrodes of each unit for a uniform time interval intermediate the beginning and end of its welding pressure interval, a pair of cooperating work clamp plates having axially aligned restricted openings for passing the electrodes of the respective welder units, means yieldably separating one of said plates from the other, means for positively moving said one plate to clamping relation with said other plate against the resistance of said yieldingly separating means, a floating support means for each clamp plate, and a series of work positioning stops operable successively to permit shifting of work between the clamp plates for distances which equal a predetermined fraction of the space between centers of adjacent welding units.

FRANK B. YINGLING.

REFERENCES CITED

The following references are of record in the file of this patent:

UNITED STATES PATENTS

| Number | Name | Date |
|---|---|---|
| 1,176,762 | Lachman | Mar. 28, 1916 |
| 1,237,915 | Lachman | Aug. 21, 1917 |
| 1,269,617 | Ledwinka | June 18, 1918 |
| 1,874,942 | Einfeldt | Aug. 30, 1932 |
| 2,042,322 | Martin | May 26, 1936 |
| 2,045,523 | Fassler | June 23, 1936 |
| 2,066,791 | McBain | Jan. 5, 1937 |
| 2,214,760 | Brown | Sept. 17, 1940 |
| 2,236,823 | Hughes | Apr. 1, 1941 |
| 2,244,006 | Harrington | June 3, 1941 |
| 2,254,303 | Michailoff et al | Sept. 2, 1941 |

FOREIGN PATENTS

| Number | Country | Date |
|---|---|---|
| 345,003 | Italy | Dec. 7, 1936 |